(12) United States Patent
Sing

(10) Patent No.: US 11,898,399 B2
(45) Date of Patent: Feb. 13, 2024

(54) COMPOSITE STIFFENER

(71) Applicant: Peter Sing, McCleary, WA (US)

(72) Inventor: Peter Sing, McCleary, WA (US)

( * ) Notice: Subject to any disclaimer, the term of this patent is extended or adjusted under 35 U.S.C. 154(b) by 0 days.

(21) Appl. No.: 17/523,712

(22) Filed: Nov. 10, 2021

(65) Prior Publication Data

US 2023/0141832 A1    May 11, 2023

(51) Int. Cl.
*E04C 3/29* (2006.01)
*E06B 3/70* (2006.01)

(52) U.S. Cl.
CPC ............ *E06B 3/7003* (2013.01); *E04C 3/29* (2013.01); *E06B 2003/7019* (2013.01); *E06B 2003/7021* (2013.01); *E06B 2003/7023* (2013.01); *E06B 2003/7051* (2013.01); *E06B 2003/7053* (2013.01)

(58) Field of Classification Search
CPC ... E04C 2/28; E04C 2/284; E04C 2/14; E04C 2/22; E04C 2/24; E04C 2/243; E04C 2/246; E04C 2/296; E04C 2/36; E04C 2/365; E04C 2/384; E04C 2/368; E04C 2/388; E04C 3/29; E04C 3/292; E04C 3/36; E04C 3/127; E04C 1/40; E06B 3/07; E06B 2003/7051; E06B 2003/7071; E06B 2003/7084; E06B 2003/7088; E06B 2003/7063; E06B 2003/7023; B27M 3/0053
USPC ................. 52/841, 783.18, 793.1, 793.11
See application file for complete search history.

(56) References Cited

U.S. PATENT DOCUMENTS

| | | | | |
|---|---|---|---|---|
| 2,501,180 A | * | 3/1950 | Kunz | B65D 5/5054 428/116 |
| 3,238,690 A | * | 3/1966 | Wilkins | E04C 3/29 52/843 |
| 3,249,659 A | * | 5/1966 | Voelker | B29C 44/332 264/46.7 |
| 3,445,325 A | * | 5/1969 | Clark | B32B 21/13 52/847 |
| 3,708,380 A | * | 1/1973 | Niebylski | B32B 15/046 52/309.3 |
| 4,186,536 A | * | 2/1980 | Piazza | E04C 2/284 428/312.4 |
| 4,294,055 A | * | 10/1981 | Andresen | B29D 24/005 428/116 |
| 4,394,409 A | * | 7/1983 | Hertel | B27B 33/20 52/847 |
| 4,503,648 A | * | 3/1985 | Mahaffey | E04C 3/29 52/223.7 |
| 4,741,144 A | * | 5/1988 | Graffin | E04C 3/292 52/847 |
| 4,852,322 A | * | 8/1989 | McDermid | E04C 3/14 52/404.3 |
| 4,937,122 A | * | 6/1990 | Talbert | B32B 27/302 428/68 |
| 5,026,593 A | * | 6/1991 | O'Brien | E04C 3/29 156/331.7 |
| 5,115,609 A | * | 5/1992 | Sing | E04C 3/14 144/368 |

(Continued)

Primary Examiner — Kyle J. Walraed-Sullivan

(57) ABSTRACT

Embodiments of the disclosure are directed towards a composite stiffener that is incorporated into panelized products to create stronger bonding, greater adhesion between laminated layers and less warping sandwich panels. In addition, the resulting products incorporating composite stiffeners can be lightweight, yet stronger than other lightweight panels.

10 Claims, 10 Drawing Sheets

(56) References Cited

U.S. PATENT DOCUMENTS

| | | | | | |
|---|---|---|---|---|---|
| 5,299,400 | A * | 4/1994 | Sing | E04C 2/243 | 144/368 |
| 5,362,545 | A * | 11/1994 | Tingley | B29C 70/083 | 156/154 |
| 5,618,371 | A * | 4/1997 | Sing | B27B 1/00 | 144/345 |
| 5,865,929 | A * | 2/1999 | Sing | B27M 1/08 | 144/345 |
| 5,896,723 | A * | 4/1999 | Sing | B27B 1/00 | 52/847 |
| 5,904,972 | A * | 5/1999 | Tunis, III | B29C 70/865 | 428/188 |
| 6,253,530 | B1 * | 7/2001 | Price | E04B 1/12 | 428/116 |
| 8,117,802 | B1 * | 2/2012 | Kisch | E04C 3/02 | 52/844 |
| 8,448,396 | B2 * | 5/2013 | Robertson | B32B 38/0036 | 52/794.1 |
| 8,516,778 | B1 * | 8/2013 | Wilkens | E04C 2/386 | 52/847 |
| 8,728,374 | B1 * | 5/2014 | Hancock | E04C 2/296 | 264/510 |
| 9,103,113 | B2 * | 8/2015 | Lockhart | E04B 2/7457 | |
| 9,441,373 | B1 | 9/2016 | Header | B27D 5/003 | |
| 9,677,264 | B2 * | 6/2017 | Iverson | E04B 2/70 | |
| 11,168,478 | B1 * | 11/2021 | Hall | E04C 3/29 | |
| 2002/0015819 | A1 * | 2/2002 | Edwards | B32B 27/04 | 428/114 |
| 2003/0205316 | A1 * | 11/2003 | Kai | B32B 21/13 | 156/250 |
| 2006/0263567 | A1 * | 11/2006 | Hofste | B27M 3/0053 | 428/57 |
| 2008/0003395 | A1 * | 1/2008 | Cui | B27M 3/0053 | 428/537.1 |
| 2008/0134621 | A1 * | 6/2008 | Haga | E04C 3/36 | 52/847 |
| 2008/0163587 | A1 * | 7/2008 | Monk | E04C 2/243 | 52/794.1 |
| 2010/0047489 | A1 * | 2/2010 | Cesternino | E04C 3/29 | 428/34.1 |
| 2010/0236172 | A1 * | 9/2010 | Wirth | E04B 1/26 | 52/309.4 |
| 2011/0167759 | A1 * | 7/2011 | Cesternino | B32B 1/06 | 52/834 |
| 2014/0314989 | A1 * | 10/2014 | Girard | E04C 3/29 | 156/60 |
| 2016/0356044 | A1 * | 12/2016 | Thompson | E04B 1/7604 | |
| 2017/0157883 | A1 * | 6/2017 | Sing | B32B 5/18 | |
| 2017/0247883 | A1 * | 8/2017 | Iverson | E04C 3/122 | |
| 2019/0145101 | A1 * | 5/2019 | Costanza | B32B 27/065 | 52/309.8 |
| 2020/0299962 | A1 * | 9/2020 | Espinosa | B32B 21/13 | |
| 2021/0032859 | A1 * | 2/2021 | Asano | B27K 3/16 | |
| 2021/0040730 | A1 * | 2/2021 | Asano | E04C 3/12 | |

\* cited by examiner

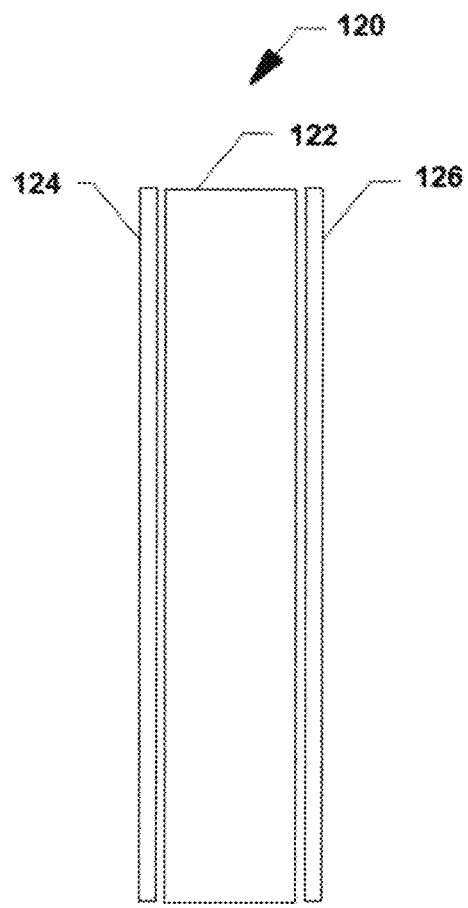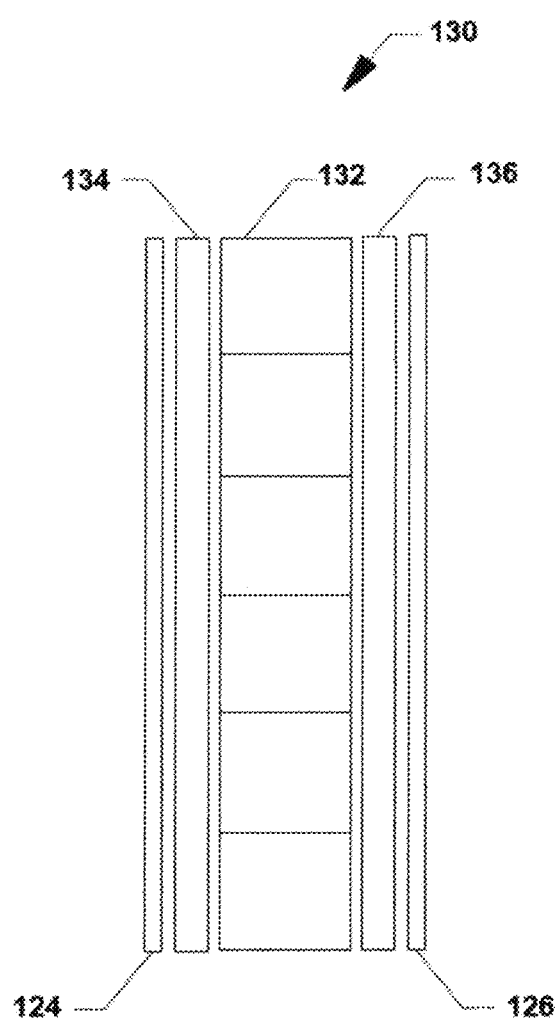
FIG. 1C
FIG. 1D

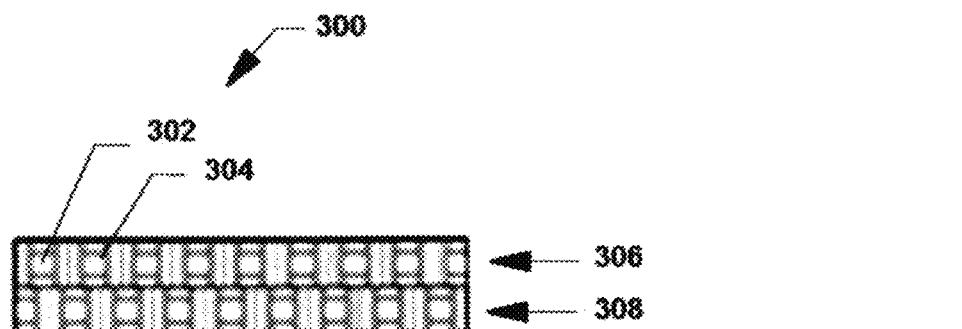
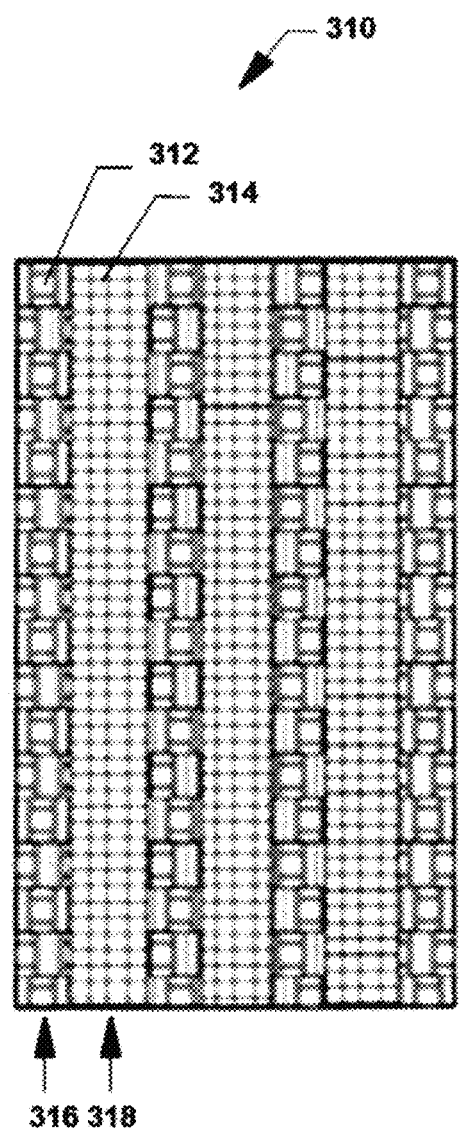
FIG. 3A
FIG. 3B

FIG.6
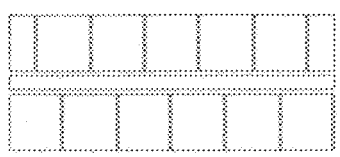
FIG. 6A
FIG. 6B
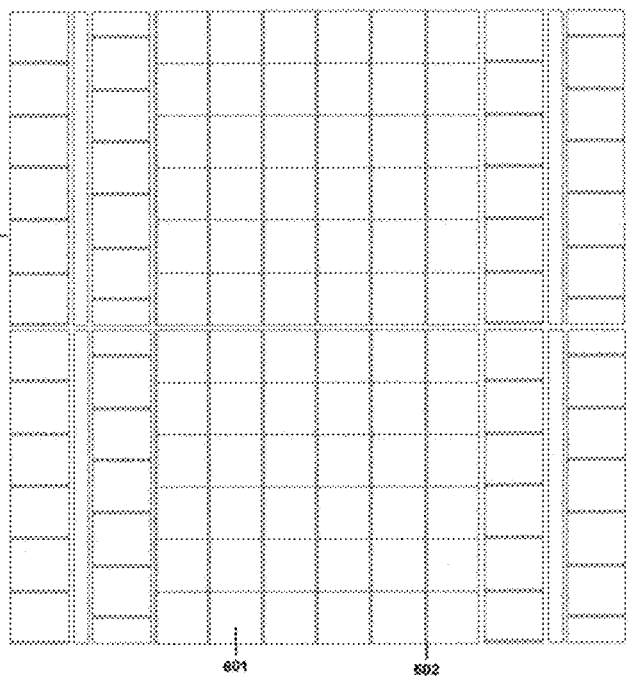
FIG. 6C
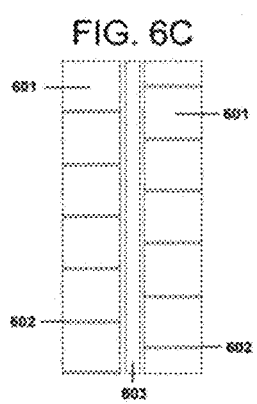
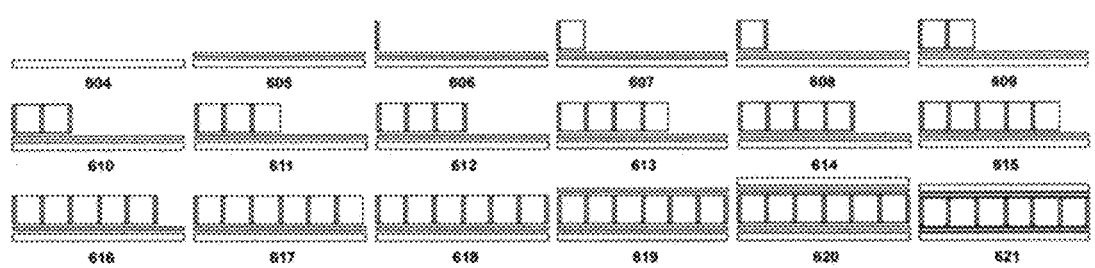
FIG. 6D
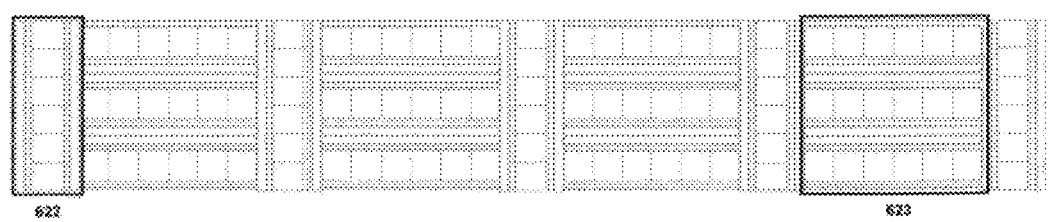
FIG. 6E

COMPOSITE STIFFENER

RELATED APPLICATIONS

This is a Continuation-In-Part under 35 U.S.C. Section 111(a) to U.S. patent application Ser. No. 15/201,411, filed Jul. 2, 2016, entitled "Composite Stiffener," and claims priority under 35 U.S.C. Section 119(e) to U.S. Provisional Application Ser. No. 62/264,199, filed Dec. 7, 2015, entitled "Composite Panel Stiffener."

BACKGROUND

Solid panels, composite panels, sandwich panels, tabletops, countertops, and doors made with any type of inner core material tend to warp, bend, or twist during the service life of the product. Prior solutions included adding, inserting, or embedding steel rods, steel frames, even steel pipes in an effort to reduce warping, but this adds considerable weight to the end product introducing a whole new set of problems. Aluminum tubes or extrusions are a lighter weight alternative to steel but also come with its own set of challenges, especially for sanding and gluing.

SUMMARY

Embodiments of the disclosure are directed towards a composite stiffener that can be manufactured and inserted or used as an alternative substrate material to create high precision true flat (truly flat) products that are less likely to warp, bend, or twist during the service life of the product. Embodiments of the composite stiffener include a uniquely designed stiffening material assembled in a designed matrix layout of flat strips, boxes, rectangles, or other shapes. The composite stiffener is positioned in various configurations either alone or in addition to any partial or complete core material inside the sandwich panel to enhance the core strength of the resulting product. The composite stiffener is inserted to compliment another core material or otherwise embedded in between layers of laminated material substantially increasing the strength, thusly preventing movement of flat building materials (skins) that would normally be subject to movement due to stress, regular use, or exposure to environmental conditions. The composite stiffener may function independently as a core material or may be added to other core material to add toughness and rigidity to the other composite materials or skins. The composite stiffener may be placed in any configuration, alone or with other material to achieve products that lay more flat with less risk of warp. This invention specifically is associated with the efficacy of the composite stiffener as it is used inside of other products which may have the tendency to move throughout its intended lifespan. Though examples of panels, posts, and beams are used as examples of how to use this composite stiffener, this invention relates only to the composite stiffener itself and the significant enhancement it offers when used inside other products not being limited to just panels, posts, and beams.

Composite stiffener eliminates the need to insert steel or other heavy reinforcement material inside a panelized material such as a sandwich panel or a door. The composite stiffener insert provides a core section that is fully adherable, whereas other materials which may be used as core may resist adhesion in the lamination process. Composite stiffener may be used sparingly inside the panel, alternating stiffener with empty sections, placed side-by-side with other core material, in a metric pattern, or could be used solely and completely for interior core throughout panel. Resulting panel is insulated, many times lighter, stronger than other panelized material, sandwich panel, or door.

Composite stiffener solves the problems associated with large door failure. Though not limited to use in doors, in the field, this unique invention is used by door companies to create very large doors that were so problematic to warranty. Large doors routinely fail not long after installation due to warp or delamination causing regular service calls within the warranty period to repair the door. For this reason, many companies refused to create doors over a certain size, for instance, over 10 ft. tall. Composite stiffener inserts within the door's core enables door companies to provide an insulated panelized door very large in size (up to 50 ft. or more) that is lightweight, strong, does not fail within the company's warranty period.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIGS. 1A-1E illustrate exemplary embodiments for a composite stiffener in accordance with the present disclosure;

FIG. 3A illustrates an exemplary panel that incorporates a configuration of composite stiffeners;

FIG. 3B illustrates another exemplary panel that incorporates another configuration of composite stiffeners;

FIG. 6 illustrates layup options (FIG. 6A-6C), the detailed buildup of a sample composite stiffener unit (FIG. 6D), and an expanded use of alternating vertical and horizontal composite stiffeners (FIG. 6E).

DETAILED DESCRIPTION

The following disclosure describes a composite stiffener for strengthening products.

Figures 1A, 1B:
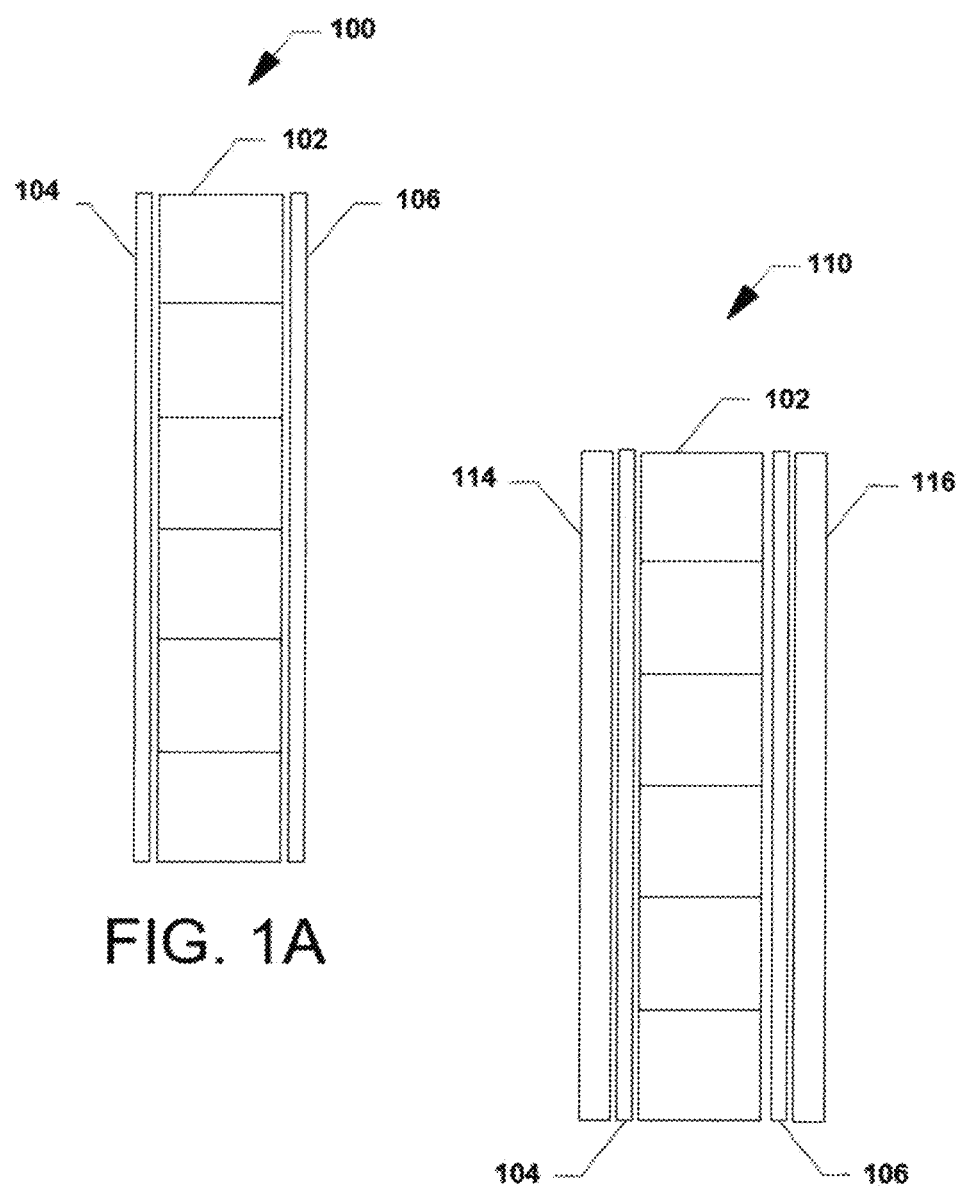

FIGS. 1A-1E illustrate exemplary embodiments for a composite stiffener in accordance with the present disclosure. The different embodiments illustrate some of the various combinations of layering composite stiffeners and flat building materials, including alternating metal (e.g., aluminum), natural (wood/plywood), or other composite materials. FIG. 1A illustrates an embodiment of a composite stiffener 100 that includes a core 102 and two strengthening strips 104, 106 positioned on opposite sides of the core 102. The material for the core 102 includes a combination of foam core, natural wood, and metal strips, or Sing Core manufactured by Sing Square Log Homes in McCleary, WA.

The two strengthening strips 104, 106 include aluminum or any other metal. FIG. 1B illustrates an embodiment of a composite stiffener 110 that includes core 102 and two strengthening strips 104, 106 with an additional outside laminate layer 114, 116 over the two strengthening strips 104, 106. 3 dimensional cubes of rigid foam are separated by wood fiber where the grain runs vertical, not horizontal as in normal torsion box design. Here, the grain runs perpendicular to the grain of the surface skin for enhanced strength and anti-warping.

Figure 1E:
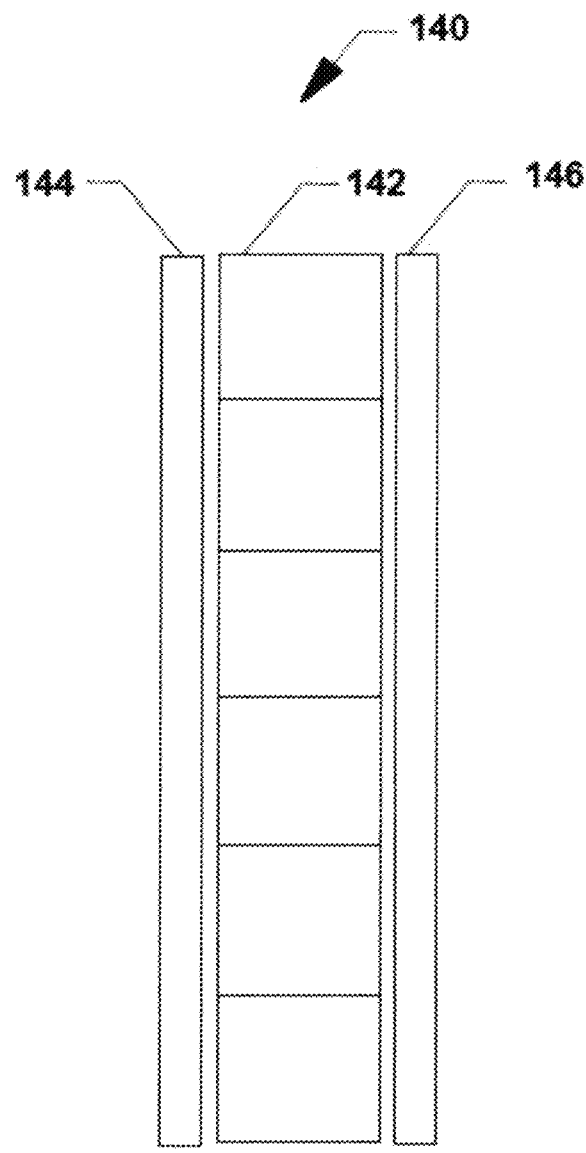

The outside laminate layer 114, 116 may include plywood or other material. FIG. 1C illustrates an embodiment of a composite stiffener 120 that includes a core 122, such as a solid core or foam core, with strengthening strips 124, 126 of a metal panel lamination. FIG. 1D illustrates an embodiment of a composite stiffener 130 that includes a core 132 with an inner layer 134, 136 layered on opposite sides of the core 132 and strengthening strips 124, 126 as an outer layer. In some embodiments, the inner layer 134, 136 includes plywood and the outer layer 124, 126 includes metal (e.g., aluminum panel lamination). FIG. 1E illustrates an embodiment of a composite stiffener 140 that includes a core 142 made of foam reinforced grid core with a layer 144, 146 of plywood lamination on opposing sides.

One skilled in the art will appreciate that different configurations of layers and materials that may be used without departing from the scope of the present invention. For example, natural wood, wood veneer, plywood, plastic, fiberglass, or a composite material may be used for one or more layers of the composite stiffener in any of its varied designs. The stiffening strip may comprise aluminum or any other material stiffener that provides strength.

Figure 2A:
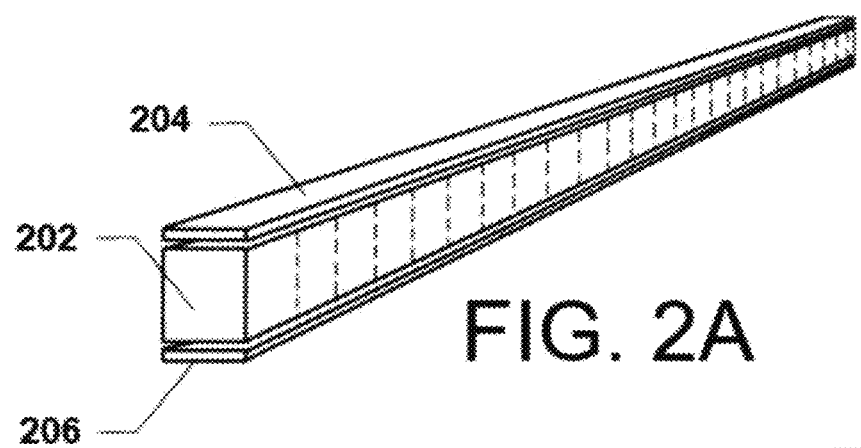
FIGS. 2A-2C illustrate additional embodiments for a composite stiffener in accordance with the present disclosure.
Figure 2B:
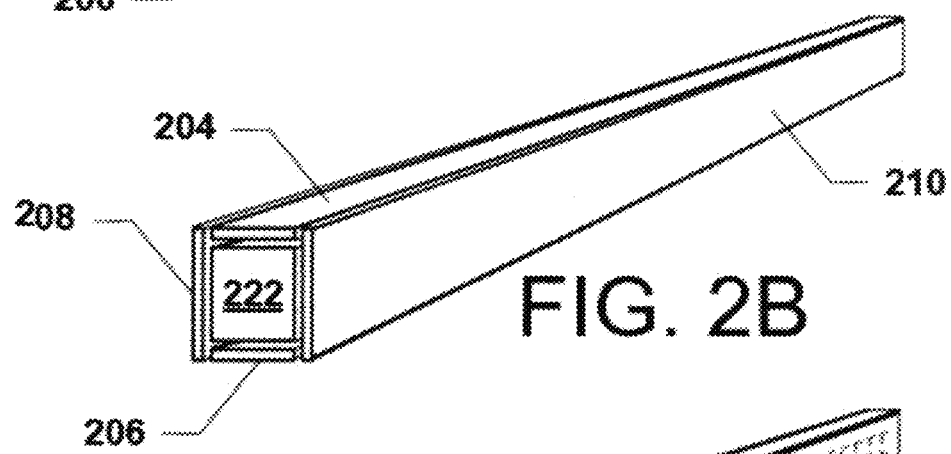
Figure 2C:
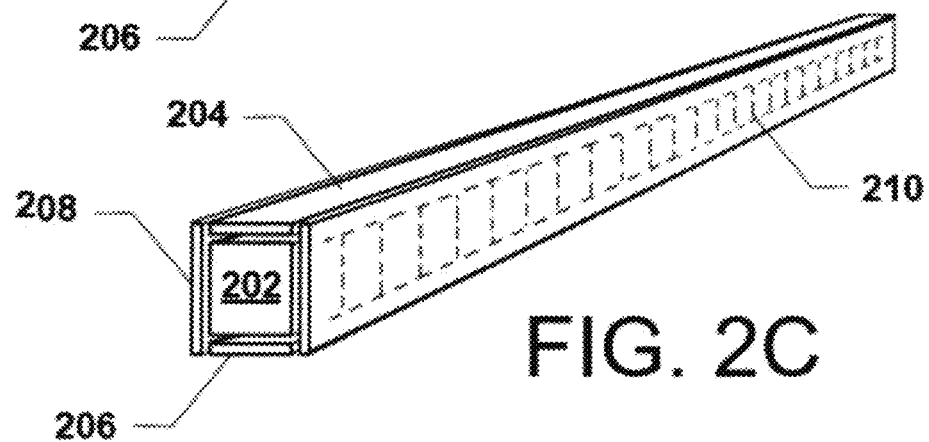

FIGS. 2A-2C illustrate additional views of embodiments for a composite stiffener in accordance with the present disclosure. FIG. 2A illustrates a composite stiffener 200 having a core 202 using SING™ core material, torsion box, or other box-like core material. Composite laminate with plywood or other specified material is layered on top 204 and bottom 206 of core 202. FIG. 2B illustrates a composite stiffener 220 having a composite laminate with plywood on all four sides 204, 206, 208, 210 of core 222. The core 222 shown in FIG. 2B represents a solid core or foam core. FIG. 2C illustrates a composite stiffener 240 having a core 202 using SING™ core material, torsion box, or other box-like core material and a composite laminate on all four sides 204, 206, 208, 210, for use as anti-warp material or as post and beam.

The composite laminate is formed in strips for use as core material or slicing for composite layup of stiffeners. Composite stiffeners are used inside a panel as core or alternating core material and run perpendicular to the surface material. Composite stiffeners and alternating other core material can be precision sanded prior to applying exterior skins. Plywood or other specified materials on the exterior can provide a sand-able surface for controlling precision core thickness. All components are either hot or cold pressed using an array of available adhesives. Adhesives can be matched to the properties of the composite materials being used in the elements of the core material. All components are pressed and allowed to cure prior to being cut into strengthening strips for use as core material inside the panel.

FIGS. 3A and 3B illustrates exemplary panels that incorporate various configurations of composite stiffeners. In these embodiments, the composite stiffener may be used as a core or sliced and used in a mosaic arrangement to strengthen the other core. The composite stiffener may be arranged in rows or in columns inside a composite panel or may be arranged in a non-repeating pattern. The embodiments allow the products to be sanded for high performance. Composite stiffener can be used in thick slices or blocks to act as a core itself, or in other embodiments, the stiffener can be used in combination with other core material in various configurations. In some embodiments, the composite stiffener may be either thin slices or thick blocks which may be used to replace other solid core material inside a panel (e.g., tabletop, countertop, door, and the like).

FIG. 3A illustrates a composite stiffener 302, 304 arranged across the entire panel 300. For this embodiment, the composite stiffeners may be arranged in rows (e.g., rows 306, 308) to cover the entire product area. The individual composite stiffeners 302, 304 for each row 306, 308 may be offset between rows to provide additional strengthening. FIG. 3B illustrates another exemplary panel 310 that incorporates another configuration of composite stiffener 312. For this embodiment, the panel 310 may be configured having columns 316, 318, where alternating columns use composite stiffener 312 or composite material 314.

Figure 4:
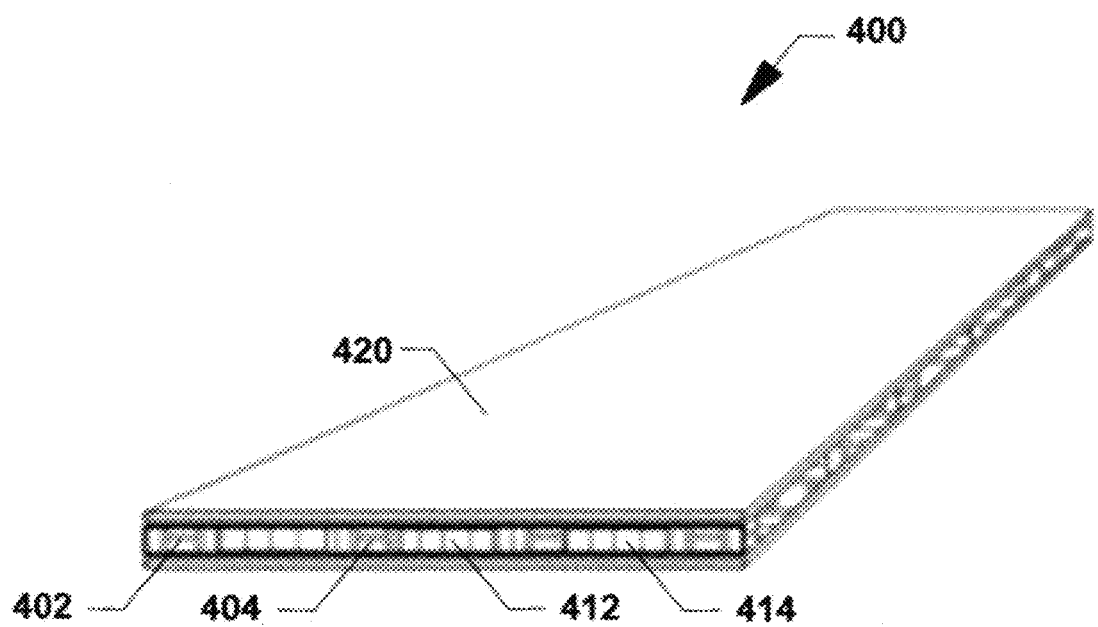
FIG. 4 illustrates another view of a composite stiffener core inside a panel with exterior skins.

FIG. 4 illustrates another view of a composite stiffener inside a panel with exterior skins. In the embodiment shown in FIG. 4, a composite stiffener (e.g., composite stiffener 402, 404) and SING™ core 412, 414 inside this combination panel 400 that is configured with an exterior skin 420 applied to both the top surface and bottom surface (not shown) which is pressed and allowed to cure as is the traditional method of creating a sandwich panel.

Figure 5:
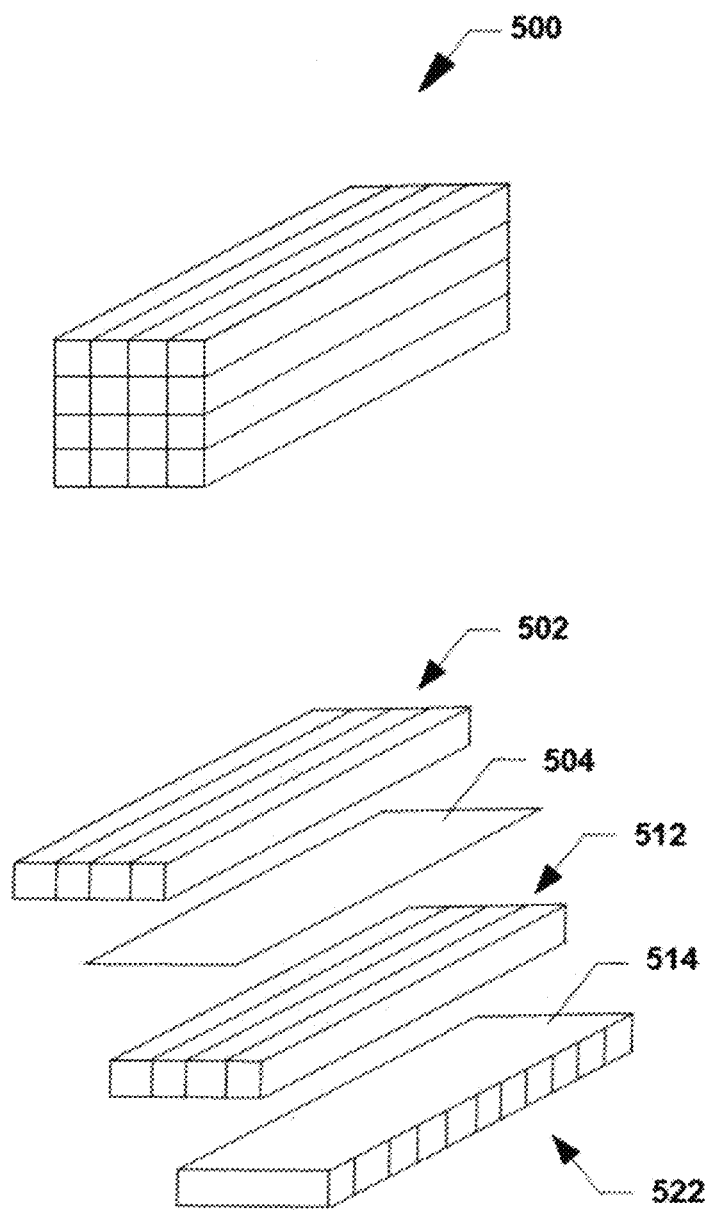
FIG. 5 illustrates an exemplary beam that incorporates a configuration of composite stiffeners.

FIG. 5 illustrates an exemplary beam 500 that incorporates a configuration of composite stiffeners. Beam 500 may include several layers of composite stiffeners (e.g., composite stiffener layer 502, 512, and 522). The layers of composite stiffeners may all be aligned in the same direction (e.g., horizontal or vertical) or different layers may be aligned in different directions. For example, composite stiffener layer 522 is illustrated having a different orientation than composite stiffener layer 502 and 512. Between the composite stiffener layers, a skin (e.g., skin 504, 514) may be bonded to the composite stiffener top and/or bottom sides. Using this configuration of composite stiffeners a post or beam may be manufactured to any length, such as 20 feet, 40 feet, 100 feet, 200 feet or the like. The beam may be used for a sailing mast and other uses. Beam 500 may be manufactured using multiple layers of a single type of stiffener, such as stiffeners shown in FIGS. 1A-1E, or manufactured using multiple layers of a combination of different types of stiffeners. One skilled in the art will appreciate that other configurations of stiffeners than shown in FIGS. 1A-1E are envisioned using the teachings of the present application. Beams that are manufactured using the teachings of the present application may be used to replace wood, steel, concrete, aluminum, and other types of currently used beams, while providing superior strength and less cost. For example, in locations where lumber is scarce or expensive, beam 500 may be used for poles to carry communication and/or entertainment cables. Beam 500 may be used to replace steel structures in wind power applications. These and other applications too numerous to list are envisioned.

FIG. 6 depicts an alternative method of creating a stiffener component. FIG. 6A shows the component in a horizontal view, and FIG. 6C shows a vertical representation delineating the location of a rigid foam cube (601) in the layout, the vertical grain wood fiber (602), and an alternative stiffening material such as plywood (602), which could also be another stiffening material, such as plastic or metal. This Composite stiffener design creates a wide component with a wide footprint for increased adhesion when used as core material inside a panelized structure, sandwich panel, or inside an insulated large sized door to keep it lightweight, and higher strength door that will resist bending, warping, or delaminating over time. As an example of practical use, FIG. 6B demonstrates composite stiffeners in use on both the right side and of a wood fiber framed (602) torsion box where the otherwise empty boxes are filled with a rigid foam insert (601).

The individual building of a composite stiffener component layup is detailed (FIG. 6D) where the first piece is a layer of plywood (604), a layer of aluminum (605), and building the midsection by adding successively a wall of veneer wood fiber (606), a rigid foam cube (607), a veneer wall (608), a rigid foam cube (609) and repeated through 618. Add a layer of aluminum (620) and finally a layer of plywood (621) to create a single composite stiffener component for adding to core material of a panel. FIG. 6E shows alternating vertical and a horizontal group of three components, for a length of material which can be precision sanded to exacting widths to match any other material which may be used as well inside any laminated panel.

Figure 7:
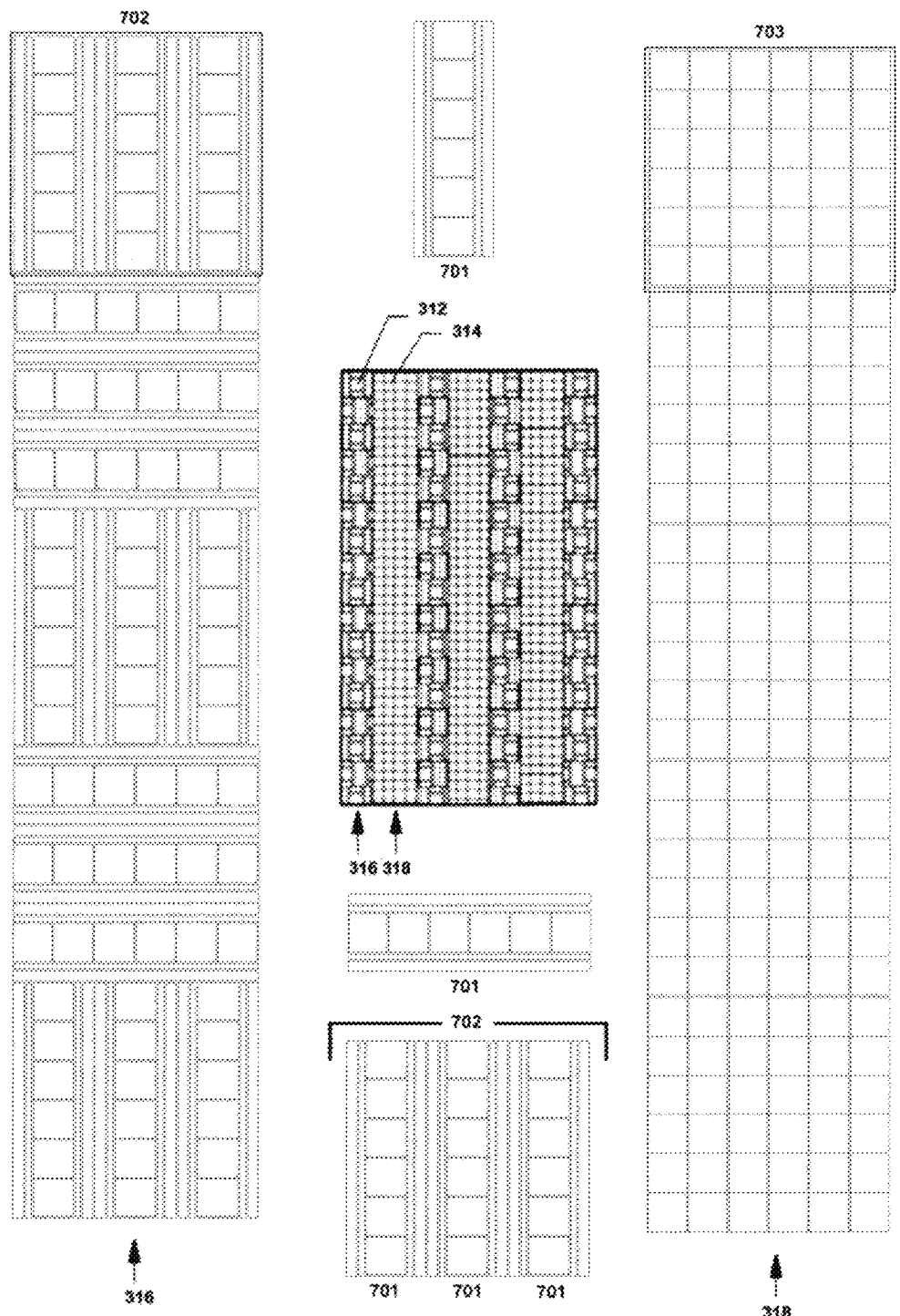
FIG. 7 illustrates expanded details from FIG. 3B for clarification.

FIG. 7 represents an expanded detail of panel core configuration FIG. 3B, by using blocks of three composite stiffeners (702) alternating vertical and horizontal orientation. In this configuration, rows of composite stiffeners are separated by a torsion box core (703) which could be blocks of veneer walled rigid foam cubes, or patented Sing Core.

Figure 8:
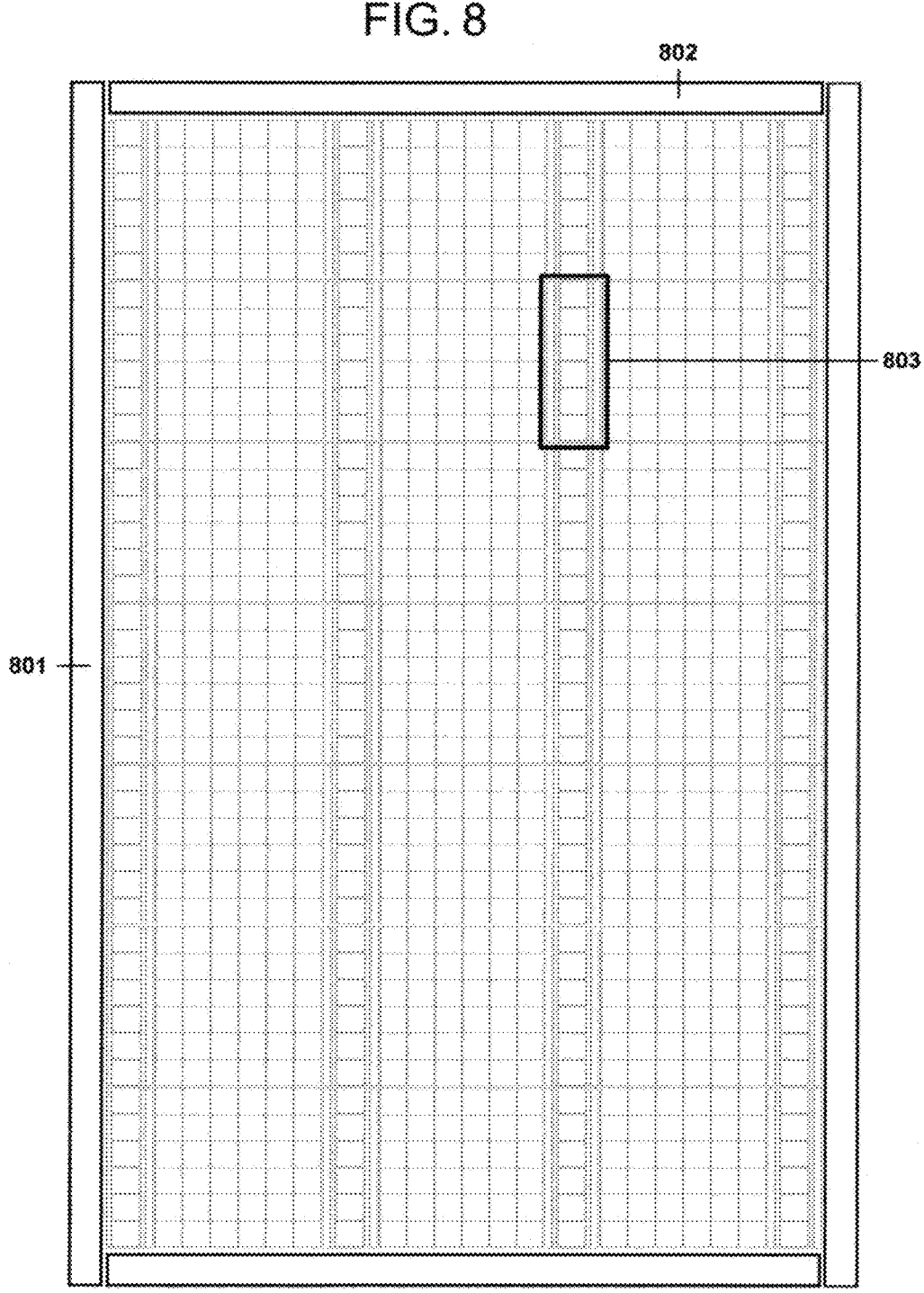
FIG. 8 illustrates a sample panel with stiffener component identified as (803).

FIG. 8 is an example of the interior of a panel using a vertical row of individual composite stiffeners (803) alternating with other torsion box material and framed by stiles (801) and rails (802).

The composite stiffener may be designed as flat strips, boxes, rectangles, or any other shape. The addition of the composite stiffener increases the strength which helps prevent movement of flat building materials (skins) that would normally be subject to movement due to stress, regular use or exposure to environmental conditions. The composite stiffener may function independently as a core material, or as an addition to other composite material or skins in any configuration to add toughness and rigidity. In embodiments in which the composite stiffener is configured as flat strips, the flat strips may be made of different combinations of foam core, honeycomb core, paper core, plastic core, SING™ core, or other sandwiched flat building material with aluminum or any type of sheet goods material on each side or in between two or more surfaces or laminated materials. The elongated strip may be used as core material, implanted or installed inside, alongside, or adhered to any sandwich core, honeycomb core, other lightweight core material or substrate.

In some embodiments, the composite stiffener may be made of a combination of wood ply, plastic ply, metal, or other sheet goods bonded together to encase (either partially or completely) a lightweight core material which include EPS foam, patented SING™ core, torsion box, or other box-like core material in the center. The composite stiffeners (elongated inner panel support strips) may be glued as core material or combined with other core materials inside the sandwich panel. Exterior sheet goods (skins) are bonded to the top and bottom of the panels which completes the enclosed box structure (or composite torsion box) with grid strips made of another flat building material such as wood, wood veneer, plywood, or other material, running between the composite strips.

These reinforced composite structure grids lock-in the two surface skins. The composite stiffener provides strength in sandwich panel walls that prevent buckling, a common problem associated with walls made of aluminum, plastic, metal, wood, and/or any combination thereof.

In the past, solutions included adding, inserting, or embedding steel rods, steel frames, even steel pipes in an effort to reduce warping, but this adds considerable weight to the end product which introduces a whole new set of problems. Aluminum tubes or extrusions are a lighter weight alternative to steel but also comes with its own set of challenges, especially sanding and gluing.

Neither steel or aluminum are as effective or strong as the composite stiffener as described in the present application. By alternating and implementing a composite box system, as that of the composite stiffener, including metal and wood materials, a better bonding surface is achieved for better adherence to the two surface skins, thus reducing delamination. In embodiments with composite stiffeners using aluminum as the metal component in the structure design as well as wood and/or plastic material(s) makes this unique composite material easy to saw, sand and glue.

In accordance with the present application, base core material may include any specified core or substrate material including (but not limited to) any rigid foam material, SING™ Core, torsion box, or other box-like natural, synthetic or metal based core or substrate material. Composite strips to create the box mosaic may include at least two pieces of any sheet goods (flat building material) to include wood fiber-based sheet goods, metal (including aluminum) or building materials made of any other natural or synthetic material or combination thereof. In accordance with the present application, a sandwich panel is a panel that includes two or more stress skins made of any surface material attached to either side of a core material. The alternating core material used in combination with composite stiffeners could be any material including honeycomb core structure made of any material such as paper, cardboard, aluminum, plastic or any other conceivable material and/or design. Core material includes solid materials such as wood or wood products and may even include a hollow core.

While the foregoing written description of the invention enables one of ordinary skill to make and use a product incorporating a composite stiffener as described above, those of ordinary skill will understand and appreciate the existence of variations, combinations, and equivalents of the described embodiments, methods, and examples herein. Thus, the invention as claimed should therefore not be limited by the above-described embodiments, methods, and examples, but by all embodiments and methods within the scope and spirit of the claimed invention.

The claimed invention is:

1. A composite stiffener comprising:
 a set of strengthening strips, each strengthening strip comprising an anti-warp composite material;
 a set of inner laminated layers; and
 a core having-torsion-box grid structure comprising a torsion box grid structure where voids are filled with foam with lengths of the voids extending along a length of the core, wherein at least one inner laminated layer of the set of inner laminated layers is bonded to at least one side of a a plurality of sides of the core, and each set of strengthening strips is bonded to an outer side of each of the inner laminated layers, and a thickness of the core is the same as a thickness of an adjacent core material in a structure in which the composite stiffener is inserted into.

2. The composite stiffener of claim 1, wherein each strengthening strip comprises a wood-based sheet and an aluminum sheet, plastic sheet, composite sheet, or plastic composite sheet.

3. The composite stiffener of claim 1, wherein each inner stabilizing laminated layer comprises a wood-based sheet.

4. A composite panel comprising a plurality of composite stiffeners of claim 1.

5. The composite panel of claim 4, further comprising a plurality of core sections wherein the plurality of composite stiffeners are dispersed alongside the plurality of core sections.

6. A composite beam comprising a plurality of composite stiffeners of claim 1.

7. The composite beam of claim 6, wherein the plurality of composite stiffeners are stacked uniformly in a same direction.

8. The composite beam of claim 6, wherein the plurality of composite stiffeners are stacked in perpendicular layers.

9. The composite panel of claim 4, wherein each composite stiffener comprises a torsion box structure core with vertical grain that is perpendicular to a surface skin of the composite panel.

10. The composite stiffener of claim 1, wherein each composite stiffener comprises plywood.

\* \* \* \* \*